US011758042B2

(12) United States Patent
Tekdas et al.

(10) Patent No.: US 11,758,042 B2
(45) Date of Patent: Sep. 12, 2023

(54) INDICATING CALLERS FOR INCOMING VOICE CALLS ON A SHARED SPEECH-ENABLED DEVICE

(71) Applicant: Google LLC, Mountain View, CA (US)

(72) Inventors: Ahmet Onur Tekdas, Mountain View, CA (US); Raunaq Shah, San Francisco, CA (US); Deniz Binay, Mountain View, CA (US); Tianyu Wang, Los Altos, CA (US); Okan Kolak, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/252,434

(22) PCT Filed: Jul. 17, 2018

(86) PCT No.: PCT/US2018/042462
§ 371 (c)(1),
(2) Date: Dec. 15, 2020

(87) PCT Pub. No.: WO2020/018078
PCT Pub. Date: Jan. 23, 2020

(65) Prior Publication Data
US 2021/0274036 A1 Sep. 2, 2021

(51) Int. Cl.
H04M 3/42 (2006.01)
G10L 15/22 (2006.01)
G10L 13/027 (2013.01)

(52) U.S. Cl.
CPC ....... H04M 3/42042 (2013.01); G10L 13/027 (2013.01); G10L 15/22 (2013.01); H04M 3/4211 (2013.01); H04M 2201/39 (2013.01)

(58) Field of Classification Search
CPC ............ H04M 3/42042; H04M 3/4211; G10L 13/027; G10L 15/22
(Continued)

(56) References Cited

U.S. PATENT DOCUMENTS 5,850,435 A * 12/1998 Devillier ............... H04M 1/578
379/221.09
8,605,880 B2 * 12/2013 Sprigg .............. H04M 3/42042
379/88.19
(Continued)

FOREIGN PATENT DOCUMENTS

| CN | 1678005 A | 10/2005 |
|---|---|---|
| CN | 103024172 A | 4/2013 |
| CN | 105100355 | 11/2015 |
| WO | WO-9107041 A * 5/1991 .......... H04M 1/6505 |

OTHER PUBLICATIONS

European Patent Office; International Search Report and Written Opinion of PCT Ser. No. PCT/US2018/042462; 15 pages; dated Mar. 14, 2019 Mar. 14, 2019.
(Continued)

Primary Examiner — Jirapon Tulop
(74) Attorney, Agent, or Firm — Gray Ice Higdon

(57) ABSTRACT

Methods, systems, and apparatus, including computer programs encoded on a computer storage medium, for indicating callers for incoming voice calls to a shared device among multiple users. The methods, systems, and apparatus include actions receiving an incoming voice call, determining a calling number and a called number from the incoming voice call, identifying a user account that corresponds to the called number, determining a contact name for the calling number based on contact entries for the user account, and providing the audible contact name for output to the device speaker.

19 Claims, 4 Drawing Sheets

(58) Field of Classification Search
USPC .......................................................... 455/415
See application file for complete search history.

(56) References Cited

U.S. PATENT DOCUMENTS

| | | | | |
|---|---|---|---|---|
| 2002/0077102 | A1* | 6/2002 | Achuthan | H04M 1/663 |
| | | | | 455/512 |
| 2003/0032415 | A1* | 2/2003 | Cho | H04M 1/578 |
| | | | | 455/567 |
| 2005/0232253 | A1* | 10/2005 | Ying | H04L 65/80 |
| | | | | 370/356 |
| 2011/0026704 | A1* | 2/2011 | Connelly | H04L 63/102 |
| | | | | 379/219 |
| 2017/0060916 | A1* | 3/2017 | Liu | H04M 1/27457 |
| 2019/0378516 | A1* | 12/2019 | Kline | G10L 25/51 |

OTHER PUBLICATIONS

European Patent Office; Communication pursuant to Article 94(3) issued in Application No. 18753284.1, 6 pages, dated Aug. 18, 2022.

China National Intellectual Property Administration; Notification of First Office Action issued in Application No. CN201880095074.4; 23 pages; dated Sep. 2, 2022.

China National Intellectual Property Administration; Notification of Second Office Action issued in Application No. CN201880095074.4; 23 pages; dated Mar. 24, 2023.

European Patent Office; Communication pursuant to Article 94(3) issued in Application no. 18753284.1, 4 pages, dated Jun. 22, 2023.

* cited by examiner

INDICATING CALLERS FOR INCOMING VOICE CALLS ON A SHARED SPEECH-ENABLED DEVICE

FIELD

This specification generally relates to shared speech-enabled devices.

BACKGROUND

Speech-enabled devices may be used to respond to speech from users. For example, a speech-enabled device may be shared by multiple users in a home so a first user may say "OK Computer, play music," the speech-enabled device may respond to the utterance by playing music, then a second user may say "OK Computer, stop music," and the speech-enabled device may then respond to the second utterance be stopping the music.

SUMMARY

Implementations described herein enable a shared device to be used by multiple users to receive incoming phone calls. For example, a shared speech-enabled device left on a counter top within a home may be used by multiple people to receive incoming phone calls. The shared device may receive incoming phone calls placed to phone numbers of each of the multiple users of the shared device. For example, the shared device may be used by two users so receive incoming phone calls to the phone number "(111) 111-1111" of a first user and the phone number "(222) 222-2222" of a second user.

Despite being shared between multiple users, the shared device is able to indicate to users a name from a contact entry instead of a phone number that initiated the call. For example, a user may have forgotten that a phone number "(123) 456-7890" is their aunt's phone number so it may be helpful for a device to indicate that an incoming call was from "Aunt Jen" instead of from the phone number "(123) 456-7890," or additionally to indicating that the phone call is from the phone number "(123) 456-7890." Users may then decide whether to answer the incoming call or not answer the incoming call based on the indication of who is calling.

In a device that is not shared, e.g., a phone used by a single user and associated with only the phone number of that single user, numbers may be associated with only a single contact entry. For example, the phone number "(123) 456-7890" may correspond to only a single contact entry for a single user. However, different users may have different contact entries for the same number. For example, a first user of the shared device may have a contact entry of "Aunt Jen" associated with the number "(123) 456-7890" and a second user of the shared device may have a contact entry of "Sis" associated with the number "(123) 456-7890." Additionally, the first user may have a different contact entry with the same name as a contact entry of the second user, "Sis," associated with the different number "(234) 567-8901."

Accordingly, to indicate a caller for an incoming call, a shared device may initially determine which number is being called and then determine the caller based on contact entries of the user that corresponds to the number that is called. For example, the speech-enabled device may determine that an incoming call is for the phone number "(222) 222-2222" which corresponds to an account of "Jane," then determine that a name of "Aunt Jen" corresponds to the calling number of "(123) 456-7890" based on a contact entry named "Aunt Jen" for "Jane," and, in response, output "Incoming call for Jane from Aunt Jen."

Accordingly, in some implementations an advantage may be that multiple users of a shared device are able to identify who is calling by providing for the same number that is calling to be indicated differently based on contact entries for different users. For example, the same number may be indicated as "Mom" or as "Mother in law" depending on the number that was called. Another advantage may be that determination of a name of a caller may be efficient. For example, the search scope for a contact entry with a number that matches the number that is calling may be focused by limiting the contact entries considered to only the contact entries for a user account of a user that is being called. Yet another advantage may be that phone contacts may be stored on a server remote from the shared device instead of on the shared device so security of phone contacts may be increased. This may be particularly beneficial for shared devices that have limited local resources, such as memory or processing power. Implementations may therefore balance competing requirements of limited local resources for storage and administration of contacts with quick and efficient provision of those contacts when receiving calls at a shared device.

In some aspects, the subject matter described in this specification may be embodied in methods that may include the actions of receiving an incoming voice call, determining a calling number and a called number from the incoming voice call, identifying a user account that corresponds to the called number, determining a contact name for the calling number based on contact entries for the user account, and providing the contact name for output.

In some implementations, identifying a user account that corresponds to the called number includes determining that the called number matches a number that corresponds with the user account and in response to determining that the called number matches that number associated with the user account, identifying the user account. In certain aspects, determining that the called number matches a number that corresponds with the user account includes obtaining multiple numbers that each separately correspond with a respective one of multiple user accounts and determining that one of the multiple numbers that are obtained matches the called number.

In some aspects, determining a contact name for the calling number based on contact entries for the user account includes providing, by a speech-enabled device and to a voice-enabled virtual assistant server, a query that includes the user account and the calling number and receiving, by the speech-enabled device and from the voice-enabled virtual assistant server, the contact name in response to the query. In some implementations, receiving, from the voice-enabled virtual assistant server, the contact name in response to the query includes receiving audio data that represents synthesized speech of the contact name.

In certain aspects, determining a contact name for the calling number based on contact entries for the user account includes obtaining contact entries for the user account, determining that the calling number matches a number that corresponds to a particular contact entry of the contact entries for the user account and in response to determining that the calling number matches the number that corresponds to the particular contact entry of the contact entries for the user account, selecting the contact name from the particular contact entry.

In some implementations, receiving an incoming voice call includes receiving an incoming voice call that indicates the calling number and the called number. In some aspects, providing the contact name for output includes outputting synthesized speech of the contact name through a speaker. In certain aspects, the incoming voice call includes a Voice over Internet Protocol (VoIP) call. In some implementations, actions include providing a name of the user account for output.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
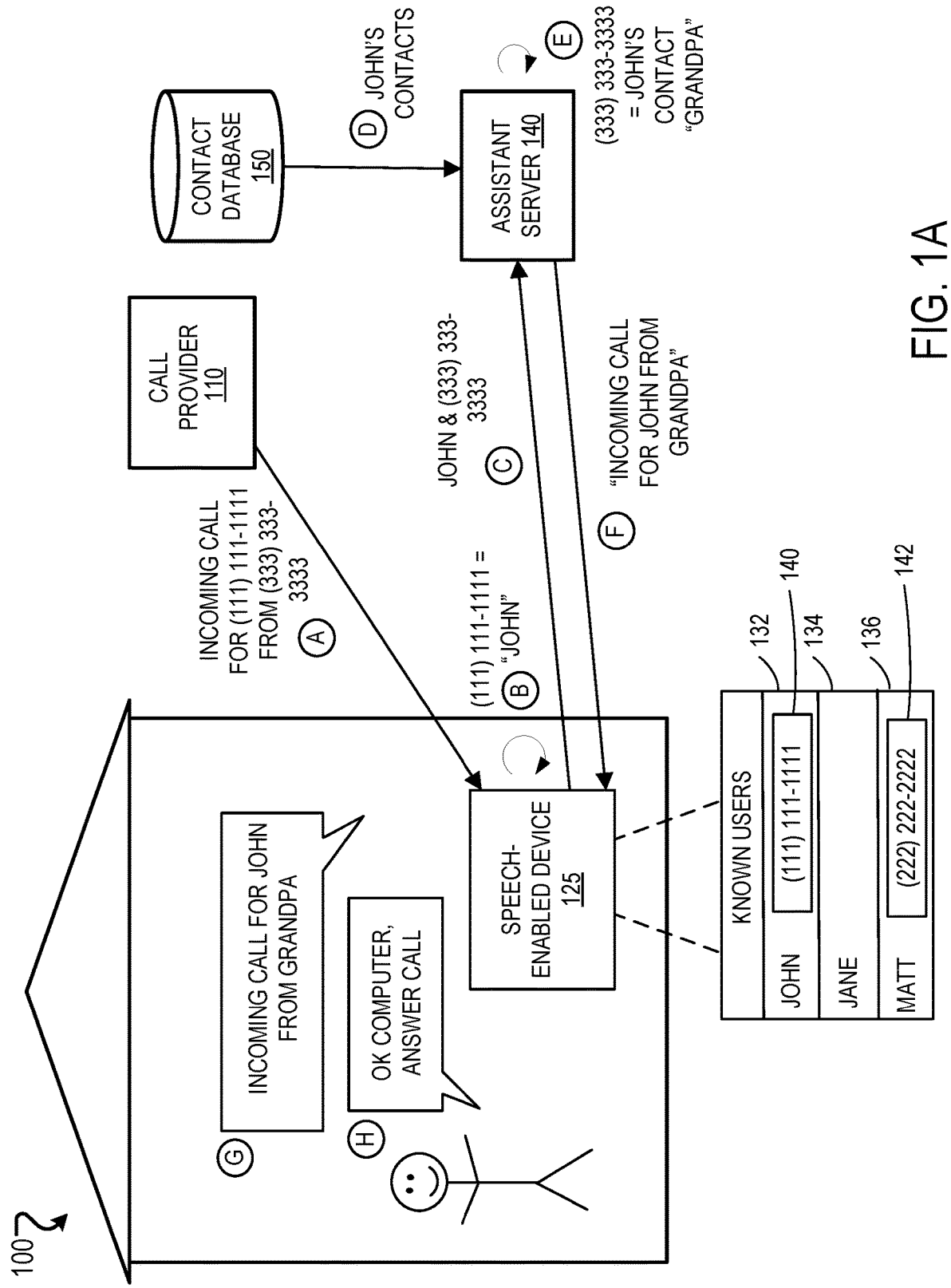
FIGS. 1A-1B are block diagrams that illustrate example interactions with a shared device indicating a caller for an incoming call.
Figure 1B:
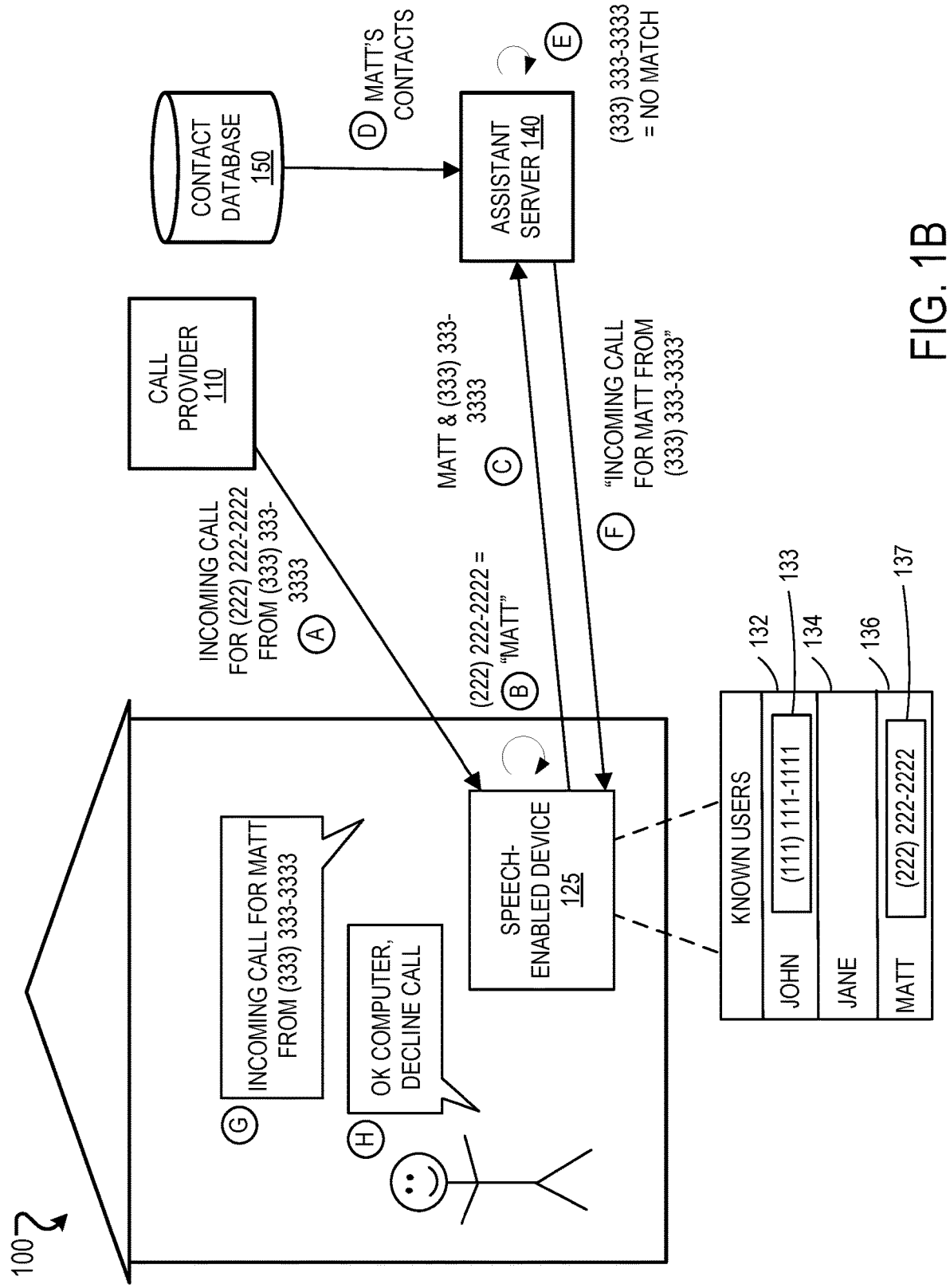

FIGS. 1A-1B are block diagrams that illustrate example interactions with a shared device indicating a caller for an incoming call. FIGS. 1A-1B show a system 100 that includes a shared speech-enabled device 125, also referred to as speech-enabled device 125, that can be used by a user to receive incoming calls. The system 100 further includes a call provider 110 that provides an incoming call to the speech-enabled device 125, an assistant server 140 that determines a name for the phone number that is calling, and a contact database 150 that stores contact entries for user accounts.

The speech-enabled device 125 may receive incoming voice calls for multiple users and then indicate names of callers from contact entries of the user that was called. For example, FIG. 1A illustrates how the speech-enabled device 125 may receive an incoming call for the phone number "(111) 111-1111" from the phone number "(333) 333-3333" and, in response, output synthesized speech of "Incoming call for John from Grandpa." In another example, FIG. 1B illustrates how the speech-enabled device 125 may receive an incoming call for the different phone number "(222) 222-2222" from the same phone number "(333) 333-3333" and, in response, output synthesized speech of "Incoming call for Matt from (333) 333-3333." The output of the speech-enabled device 125 may be different as the contact entries of the user account corresponding to the number that is called are different. For example, the user account of "John" may include a contact entry named "Grandpa" with a phone number of "(333) 333-3333" while the user account of "Matt" may not include any contact entry with a phone number of "(333) 333-3333." A voice call may be a call that includes only audio or a call that includes audio and one or more other components, e.g., video.

In more detail, the speech-enabled device 125 may perform actions in response to detecting an utterance including a predetermined phrase, also referred to as a hotword, that a user speaks to address the speech-enabled device 125. A hotword may be "OK Computer" or some other phrase, that a user must speak immediately preceding any request that the user says to the speech-enabled device 125. For example, in response to a user saying "OK Computer, answer call," the speech-enabled device 125 may answer an incoming call. In another example, in response to a user saying "OK Computer, decline call," the speech-enabled device 125 may decline an incoming call. Declining an incoming may include one or more of sending the incoming call straight to a voicemail of the user account or no longer indicating that the call is incoming. The speech-enabled device 125 may receive utterances using one or more microphones included in the speech-enabled device 125 and output audible responses to the utterances through one or more speakers included in the speech-enabled device 125.

The speech-enabled device 125 may store user account information for each known user of the speech-enabled device 125. For example, the speech-enabled device 125 may store a first set of user account information 132 for the known user "John," a second set of user account information 134 for the known user "Jane," and a third set of user account information 136 for the known user "Matt."

The user account information may be stored in response to users registering to use the speech-enabled device 125. For example, the users "John," "Jane," and "Matt" may register with the speech-enabled device 125 and, in response, the user account information for each user may be stored on the speech-enabled device 125. Registering with the speech-enabled device 125 may enable the users to personalize interactions with the speech-enabled device 125. For example, registering with the speech-enabled device 125 may enable the speech-enabled device 125 to recognize speech from a particular user and then provide responses specific to that user. Additionally or alternatively, registering with the speech-enabled device 125 may enable users to receive incoming voice calls through the speech-enabled device 125. For example, "John" and "Matt" may receive incoming phone calls as they both registered and indicated that they would like to receive calls to "(111) 111-1111" and "(222) 222-2222," respectively.

The user account information of a user may indicate speaker identification features that may be used to recognize whether a speaker is the user. For example, the first set of user account information 132 for "John" may store mel-frequency cepstral coefficients (MFCCs) features, which collectively can form a feature vector, that represent the user "John" previously saying a hotword multiple times. Recognition of the speaker may be used to personalize responses to utterances.

In some implementations, a user may register as a known user through a companion application on a mobile computing device where the mobile computing device is in communication with the speech-enabled device 125 via a local wireless connection. For example, a user "John" may log into his account through a companion application on his phone, then indicate in the companion application that he would like to register as a known user of the speech-enabled device 125, and then say a hotword multiple times into his phone.

As part of the registration, or afterwards, a user may indicate whether the user would like to associate a phone number for use to receiving incoming calls on the speech-enabled device 125. For example, the user "John" may indicate he would like to receive incoming calls to the phone number "(111) 111-1111" on the speech-enabled device 125 and, in response, the speech-enabled device 125 may store a phone number 133 in John's account information 132. In another example, the user "Matt" may indicate he would like to receive incoming calls to the phone number "(222) 222-2222" on the speech-enabled device 125 and, in response, the speech-enabled device 125 may store a phone number 137 in Matt's account information 136.

The user account information of a user may indicate a name of the user account. For example, the first set of user account information 132 for "John" may store the name "John." The name of the user account may identify the user to which the account belongs. For example, the name "John" of the user account may indicate that the account belongs to John and that information stored in the account information is for "John."

The speech-enabled device 125 may receive calls through a call provider 110. For example, the call provider 110 may be a server of a Voice over Internet Protocol (VoIP) provider that routes calls to the phone number "(111) 111-1111" to both the speech-enabled device 125 and a phone associated with the user account of the user "John." In another example, the call provider 110 may be a system of cellular network provider that routes calls to the phone number "(111) 111-1111" to both the speech-enabled device 125 and a phone associated with the user account of the user "John." In a particular example, the speech-enabled device 125 may receive, from the call provider 110, an incoming call for the phone number "(111) 111-1111" from "(333) 333-3333" (as indicated by the arrow labeled A in FIG. 1A).

In response to receiving a call, the speech-enabled device 125 may identify a user account that corresponds to the phone number that was called. For example, in response to receiving the incoming call for the phone number "(111) 111-1111" from "(333) 333-3333," the speech-enabled device 125 identify a user account of "John" (as indicated by the arrow labeled B in FIG. 1A).

The speech-enabled device 125 may identify a user account that corresponds to the phone number that was called based on determining that the phone number that was called matches a phone number stored in account information on the speech-enabled device 125. For example, the speech-enabled device 125 may access the phone number "(111) 111-1111" for the user account of "John" and "(222) 222-2222" for the user account of "Matt" from the account information stored on the speech-enabled device 125, and then determine that the phone number "(111) 111-1111" that was called matches to accessed phone number "(111) 111-1111" from the user account of "John." Two phone numbers may be considered to match when the phone numbers are identical.

The speech-enabled device 125 may then provide an indication of the user account that is being called and the phone number that was called to the assistant server 140. For example, the speech-enabled device 125 may provide a query for a contact name to the assistant server 140, where the query includes (i) an identifier that uniquely identifies the user account of "John" from other user accounts and (ii) the phone number "(333) 333-3333" (as indicated by the arrow labeled C in FIG. 1A). In some implementations, the identifier may be an authentication token that both uniquely identifies the user account and also authenticates the speech-enabled device 125 as a device that should have access to in information based on contact entries of the user account.

The speech-enabled device 125 may then receive a contact name from the assistant server 140 in response to the indication. For example, the speech-enabled device 125 may receive a response that is synthesized speech of "Incoming call for John from Grandpa" (as indicated by the arrow labeled F in FIG. 1A). In another example, the speech-enabled device 125 may receive text of "Incoming call for John from Grandpa."

The speech-enabled device 125 may then output the contact name. For example, the speech-enabled device 125 may output received synthesized speech of "Incoming call for John from Grandpa" on a speaker (as indicated by the box labeled G in FIG. 1A). In another example, the speech-enabled device 125 may synthesize speech from received text of "Incoming call for John from Grandpa" and then output the synthesized speech on a speaker. In yet another example, the speech-enabled device 125 may display text of "Incoming call for John from Grandpa" on a screen.

The speech-enabled device 125 may then receive a query from a user in response to the output of the contact name. For example, the speech-enabled device 125 may receive a query of "OK Computer, answer call" from a user (as indicated by the box labeled H in FIG. 1A). The speech-enabled device 125 may then answer the call in response to the query and the user may then talk through the speech-enabled device 125 with the other person that called them. In receiving the utterance, the speech-enabled device 125 may determine that an utterance includes a hotword, in response, provide a representation of "OK computer, answer call" to the assistant server 140, receive an instruction from the assistant server 140 that triggers the speech-enabled device 125 to answer a call, and, in response, answer the call.

The assistant server 140 may be a server that is remote from the speech-enabled device and that provides a response to both the indication of the user account that is being called and the phone number. For example, the assistant server 140 may provide a response of "Incoming call for John from Grandpa" in response to a query that includes the identifier of the user account of "John" and the phone number "(333) 333-3333" (as indicated by the arrow labeled F in FIG. 1A).

The assistant server 140 may provide the response by determining a contact name for the calling phone number based on contact entries of the user account. For example, the assistant server 140 may determine that the phone number "(333) 333-3333" matches the phone number of a contact entry named "Grandpa" for the user account of "John," in response, synthesize speech saying "Incoming call for John from Grandpa," and then provide the synthesized speech to the speech-enabled device 125. In another example, the assistant server 140 may determine that the phone number "(333) 333-3333" matches the phone number of a contact entry named "Grandpa" for the user account of "John," in response, provide text of "Incoming call for John from Grandpa" to the speech-enabled device 125 to then synthesize speech from the text.

The assistant server 140 may determine a contact name for a calling phone number by obtaining contact entries of the user account identified that are stored in a contact database 150. For example, the assistant server 140 may provide a query to the contact database 150 for all contact entries stored for the user account of "John." In some implementations, the contact entries stored in the contact database 150 may be inaccessible to the speech-enabled device 125. In some implementations, the contact database 150 may be incorporated in the assistant server 140 and contacts may similarly not be stored on the speech-enabled device 125.

In some implementations, the assistant server 140 may not be able to determine a contact name for a calling phone number from contact entries of a user account. For example, the assistant server 140 may determine that the phone number "(555) 555-5555" does not match the phone number of any contact entry for the user account of "John," and, in response, determine to provide the phone number of the caller instead of a contact name from a contact entry, e.g., provide text of "Incoming call for John from (555) 555-5555" to the speech-enabled device 125 to then synthesize speech from the text or provide synthesized speech of "Incoming call for John from (555) 555-5555."

In some implementations, in response to not being able to determine a contact name for a calling phone number from contact entries of a user account, the assistant server 140 may attempt to search for a name for the phone number from publicly available information. For example, the assistant server 140 may search a knowledge graph for an entity that is associated with a phone number of "(555) 555-5555," determine that "Company X" is associated with that phone number, and in response, provide a response of "Incoming call for John from Company X" or "Incoming call for John from (555) 555-5555 which may correspond to Company X based on publicly available information. In another example, the assistant server 140 may search a knowledge graph for an entity that is associated with a phone number of "(555) 555-5555," determine that no entity is associated with that phone number, and in response, provide a response of "Incoming call for John from (555) 555-5555."

In some implementations, the speech-enabled device 125 may be a local front-end device that handles queries in cooperation with an assistant server 140. For example, when the speech-enabled device 125 receives an utterance "OK Computer, answer call," the speech-enabled device 125 may detect when a speaker says a hotword "OK Computer," classify a user as "John" based on speaker identification features in the utterance of "OK Computer," and provide a representation of "answer call," an indication that the speaker is "John," and an indication that a call is incoming to a server. The server may then transcribe "answer call," determine that the text "answer call" corresponds to an action of answering a call, determine from the indication that a call is incoming so a call can be answered, and, in response, provide an instruction of "answer call" to the speech-enabled device 125.

In another example, when the speech-enabled device 125 receives an utterance "OK Computer, decline call," the speech-enabled device 125 may detect when a speaker says a hotword "OK Computer," classify a user as "John" based on speaker identification features in the utterance of "OK Computer," and provide a representation of "answer call," an indication that the speaker is "John," and an indication that a call is incoming to a server. The server may then transcribe "decline call," determine that the text "decline call" corresponds to an action of declining a call, determine from the indication that a call is incoming so a call can be declined, and, in response, provide an instruction of "decline call" to the speech-enabled device 125.

FIG. 1B shows another example where the call provider 110 provides the speech-enabled device 125 a call for "(222) 222-2222" incoming from "(333) 333-3333" (as indicated by the arrow labeled A in FIG. 1B). The speech-enabled device 125 then determines that the called number of "(222) 222-2222" corresponds to a user account of "Matt" (as indicated by the arrow labeled B in FIG. 1B). The speech-enabled device 125 then provides a query for a contact name to the assistant server 140, where the query includes an authentication token for a user account of "Matt" and includes the called number of "(333) 333-3333" (as indicated by the arrow labeled C in FIG. 1B). In response to receiving the query, the assistant server 140 then requests and receives in response contact entries for the user account of "Matt" from the contact database 150 (as indicated by the arrow labeled D in FIG. 1B). The assistant server 140 then determines that the calling number of "(333) 333-3333" does not match the phone number stored for any contact entry for the user account of "Matt" (as indicated by the arrow labeled E in FIG. 1B). The assistant server 140 then provides a response of "Incoming call for Matt from (333) 333-3333 (as indicated by the arrow labeled E in FIG. 1B). The speech-enabled device 125 may then output "Incoming call for Matt from (333) 333-3333" through a speaker (as indicated by the arrow labeled G in FIG. 1B) and receive a response from a user saying "OK Computer, decline call" (as indicated by the arrow labeled H in FIG. 1B).

Different configurations of the system 100 may be used where functionality of the speech-enabled device 125, the call provider 110, the assistant server 140, and the contact database 150 may be combined, further separated, distributed, or interchanged. For example, the speech-enabled device 125 may perform some of the actions described by the assistant server 140. In particular, the speech-enabled device 125 may receive the utterance "OK Computer, answer call," transcribe the utterance into "OK Computer, answer call," determine that the transcription "answer call" corresponds to an action of answering a call, determine that a call is incoming, and, in response, answer the call. In another example, the speech-enabled device 125 may store all contacts of all known users that are registered to use the particular speech-enabled device 125 and then when a phone call is incoming, similarly only search the contact entries of the user account that corresponds to the number that was called to identify a contact name for the caller.

Figure 2:
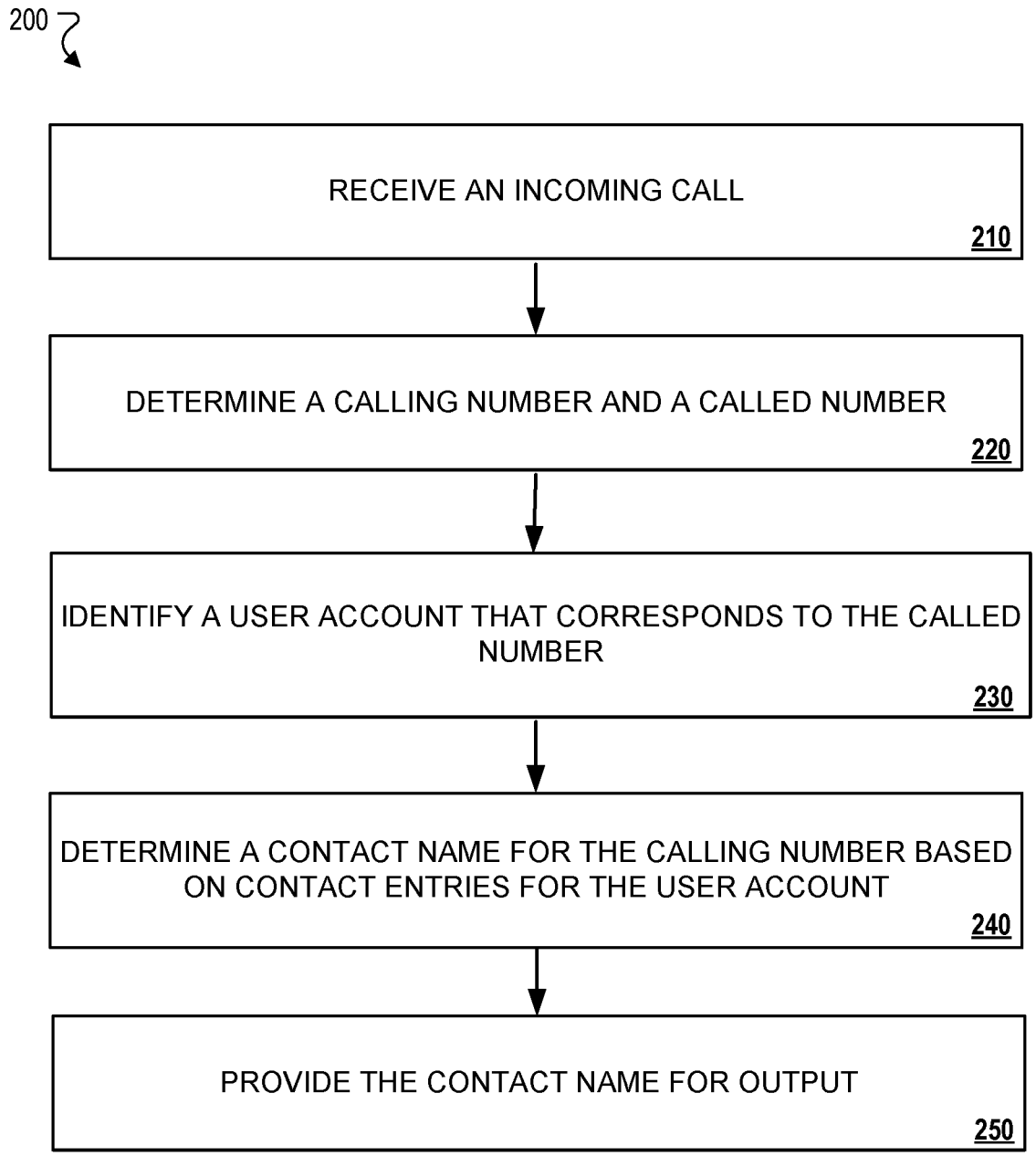
FIG. 2 is a flow diagram that illustrates an example of a process for indicating a caller for an incoming call.

FIG. 2 is a flow diagram that illustrates an example of a process 200 for indicating a caller for an incoming call. The operations of the process 200 may be performed by one or more computing systems, such as the system 100 of FIGS. 1A-1B.

The process 200 includes receiving an incoming voice call (210). For example, the speech-enabled device 125 may receive from the call provider 110 an incoming call for "(111) 111-1111" from "(333) 333-3333."

The process 200 includes determining a calling phone number and a called phone number from the incoming voice call (220). For example, the speech-enabled device 125 may extract the calling phone number of "(333) 333-3333" and the called phone number of "(111) 111-1111" from the incoming phone call.

The process 200 includes identifying a user account that corresponds to the called phone number (230). For example, the speech-enabled device 125 may identify the user account of "John" in response to searching account information of known users stored on the speech-enabled device 125 for a user account with a phone number of "(111) 111-1111," and determining that the user account "John" includes the phone number.

The process 200 includes determining a contact name for the calling phone number based on contact entries for the user account (240). For example, the speech-enabled device 125 may determine a contact name of "Grandpa" for the calling phone number of "(333) 333-3333" based on contact entries for the user account "John." As discussed above, the speech-enabled device 125 may determine the contact name by providing a query identifying a user account and the calling phone number to the assistant server 140, and then receiving a response that indicates the contact name. For example, the speech-enabled device 125 may provide the assistant server 140 a query for a contact name, where the query includes "8704584" that is an authentication for the user account of "John" and the number "3333333333" and, in response, the virtual server 140 may provide an audio representation of synthesized speech of "Incoming call for John from Grandpa."

While some description is provided regarding the use of phone numbers and phone calls, in some implementations other identifiers besides phone numbers or numbers may be used. For example, some implementations may use e-mail addresses, provider specific usernames or provider specific handles that may be used to identify a caller and a call recipient instead of using phone numbers.

Additionally or alternatively, in some implementations, the speech-enabled device 125 may verify that a user may answer an incoming call before answering the call. For example, the speech-enabled device 125 may verify that a user John can answer an incoming call for John before answering the call. The speech-enabled device 125 may verify that a user may answer an incoming call by performing speaker identification. For example, the speech-enabled device 125 may verify that a user that says "OK Computer, answer call" is a known user John. The speech-enabled device 125 may perform speaker verification using speaker identification features stored on the speech-enabled device 125 for known users. For example, the speech-enabled device 125 may determine that MFCCs for "OK Computer, answer call" match stored MFCCs for the known user John and, in response, determine that the user is John.

The speech-enabled device 125 may allow users to answer their own incoming calls. For example, the speech-enabled device 125 may determine that John said "OK Computer, answer call" for an incoming call for John and, in response, answer the call. In another example, the speech-enabled device 125 may determine that John said "OK Computer, answer call" for an incoming call for Matt and, in response, not answer the call and output "Sorry this call is for Matt and you are not authorized to answer calls for Matt."

In some implementations, the system 100 may enable users to authorize other users to answer incoming calls for them. For example, a known user John may specify that he authorizes known user Matt to answer calls for him. The speech-enabled device 125 or the assistant server 140 may store an indication that the known user authorizes another known user to answer their calls. In some implementations, a user may specify that any user can answer incoming calls for them and the speech-enabled device 125 or the assistant server 140 may store a corresponding indication.

According, an example process for answering a call may include, receiving an utterance that indicates to answer an incoming call, determining an identity of the speaker, determining whether the speaker is authorized to answer calls for the user being called, and, in response to determining that the speaker is authorized to answer calls for the user being called, answering the call. For example, the speech-enabled device 125 may receive an utterance of "OK Computer, answer call" spoken by the user Matt for a call announced as for John, determine that Matt spoke the utterance, determine that Matt is authorized to answer incoming calls for the user John based on an indication stored by the assistant server 140 that John has authorized Matt to answer his calls, and, in response, answer the call. In another example, the speech-enabled device 125 may receive an utterance of "OK Computer, answer call" spoken by the user John for a call announced as for Matt, determine that John spoke the utterance, determine that John is not authorized to answer incoming calls for the user Matt based on no indication stored by the assistant server 140 that Matt has authorized John to answer his calls, and, in response, not answer the call.

Figure 3:
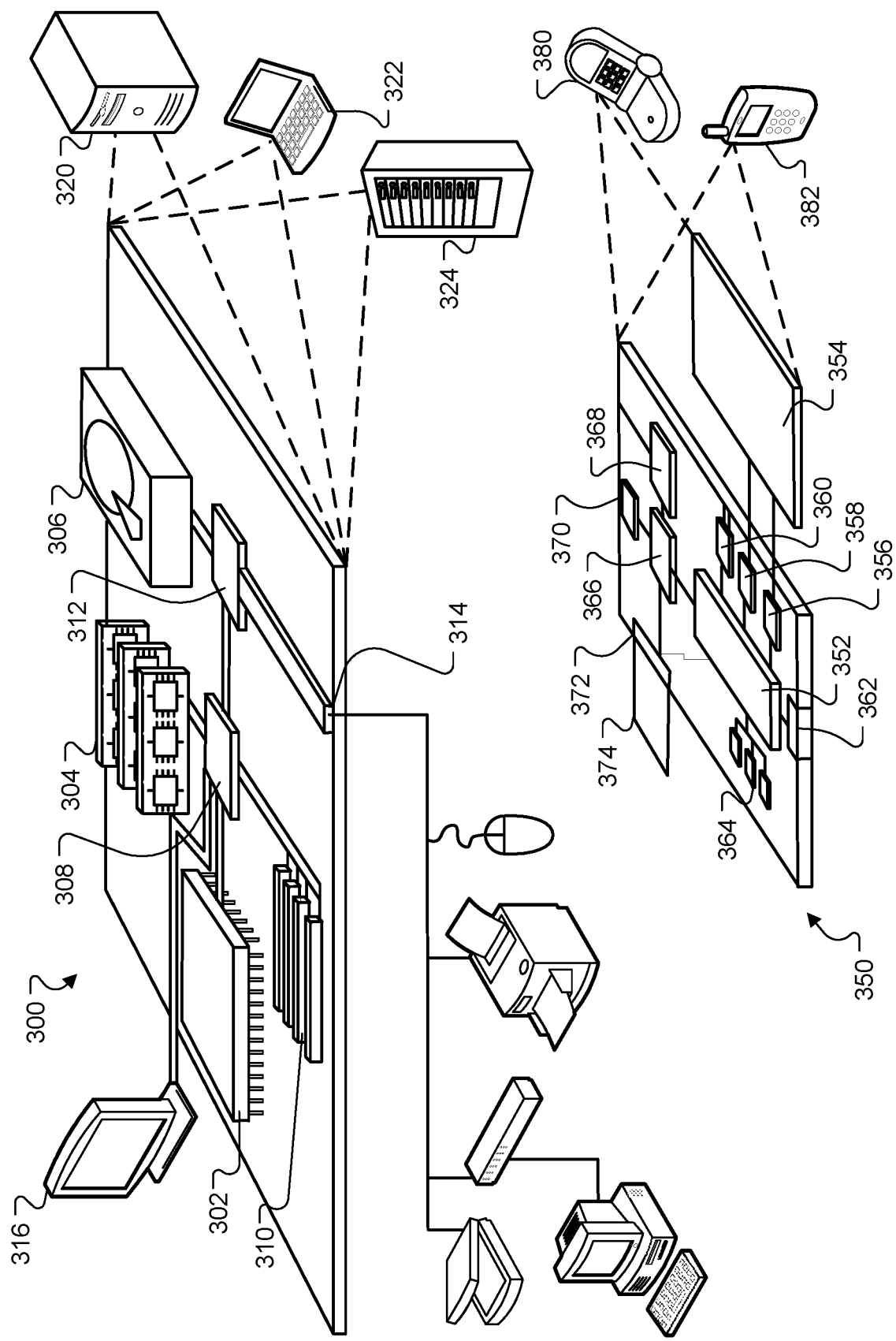
FIG. 3 is a diagram of examples of computing devices.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, at a shared speech-enabled device that is associated with a plurality of users, an indication of an incoming voice call;
   determining, at the shared speech-enabled device, and based on the incoming voice call, a calling number and a called number, the called number being associated with a given user from among the plurality of users that are associated with the shared speech-enabled device, and the calling number being associated with a distinct user that is distinct from each of the plurality of users that are associated with the shared speech-enabled device;
   identifying, at the shared speech-enabled device, and based on the called number, a user account that is associated with the given user;
   determining whether contact entries associated with the user account include a contact name for the-distinct user that is associated with the calling number, wherein determining whether the contact entries associated with the user account include the contact name for the distinct user that is associated with the calling number comprises:
provides, by the speech-enabled device and to a server, a query that includes the user account and the calling number; and
receiving, by the speech-enabled device and from the server, responsive content that is responsive to the query;
in response to determining that the responsive content includes the contact name for the distinct user that is associated with the calling number:
providing, for audible output at the shared speech-enabled device, at least
(i) an indication of the given user that is associated with the called number, and
(ii) an indication of the contact name for the distinct user that is associated with the calling number;
in response to determining that the responsive content does not include the contact name for the distinct user that is associated with the calling number:
providing, for audible output at the shared speech-enabled device, at least
(i) an indication of the given user that is associated with the called number, and
(ii) an indication of the calling number without any reference to any contact name; and
in response to providing the audible output at the shared speech-enabled device:
receiving, at the shared speech-enabled device, audio data that captures a voice command for how to handle the incoming voice call;
determining, at the shared speech-enabled device, and based on processing the audio data that captures the voice command, whether to execute the voice command;
in response to determining to execute the voice command and in response to determining that the voice command indicates a desire to answer the incoming call:
answering, by the shared speech-enabled device, the incoming call on behalf of the given user; and
in response to determining to execute the voice command and in response to determining that the voice command indicates a desire to not answer the incoming call:
refraining from answering, by the shared speech-enabled device, the incoming call on behalf of the given user.

2. The method of claim 1, wherein identifying the user account that is associated with the given user comprises:
determining that the called number matches a number that corresponds with the user account; and
in response to determining that the called number matches that number associated with the user account, identifying the user account that is associated with the given user.

3. The method of claim 2, wherein determining that the called number matches the number that corresponds with the user account comprises:
obtaining multiple numbers that each separately correspond with a respective one of multiple user accounts accessible by the shared speech-enabled device; and
determining that one of the multiple numbers that are obtained matches the called number.

4. The method of claim 1, wherein receiving, by the speech-enabled device and from the server, the responsive content that is responsive to the query comprises:
receiving audio data that represents synthesized speech corresponding to (ii) the indication of the contact name for the distinct user that is associated with the calling number.

5. The method of claim 1, wherein determining whether the contact entries associated with the user account include the contact name for the distinct user that is associated with the calling number further comprises:
receiving the contact entries associated with the user account as the responsive content that is responsive to the query;
determining that the calling number matches a number that corresponds to a particular contact entry, of the contact entries, associated with the user account; and
in response to determining that the calling number matches the number that corresponds to the particular contact entry, of the contact entries, associated with the user account, determining that the responsive content includes the contact name for the distinct user that is associated with the calling number.

6. The method of claim 1, wherein the indication of the incoming voice call indicates the calling number and the called number.

7. The method of claim 1, wherein providing at least (i) the indication of the given user that is associated with the called number, and (ii) the indication of the contact name for the distinct user that is associated with the calling number, for audible output at the shared speech-enabled device comprises:
outputting synthesized speech that includes at least (i) the indication of the given user that is associated with the called number, and (ii) the indication of the contact name for the distinct user that is associated with the calling number via a speaker of the shared speech-enabled device.

8. The method of claim 1, wherein the incoming voice call comprises a Voice over Internet Protocol (VoIP) call.

9. The method of claim 1, wherein determining, at the shared speech-enabled device, and based on processing the audio data that captures the voice command, whether to execute the voice command comprises:
performing, at the shared speech-enabled device, and based on processing the audio data that captures the voice command, speaker identification to determine whether the voice command was provided by the given user,
wherein determining to execute the voice command is based on determining that the voice command was provided by the given user.

10. The method of claim 9, further comprising:
in response to determining to not execute the voice command:
refraining from executing, by the shared speech-enabled device, the voice command,
wherein determining to not execute the voice command is based on determining that the voice command was not provided by the given user.

11. A system comprising:
one or more computers and one or more storage devices storing instructions that are operable, when executed by the one or more computers, to cause the one or more computers to perform operations comprising:

receiving, at a shared speech-enabled device that is associated with a plurality of users, an indication of an incoming voice call;

determining, at the shared speech-enabled device, and based on the incoming voice call, a calling number and a called number, the called number being associated with a given user from among the plurality of users that are associated with the shared speech-enabled device, and the calling number being associated with a distinct user that is distinct from each of the plurality of users that are associated with the shared speech-enabled device;

identifying, at the shared speech-enabled device, and based on the called number, a user account that is associated with the given user;

determining whether contact entries associated with the user account include a contact name for the distinct user that is associated with the calling number, wherein determining whether the contact entries associated with the user account include the contact name for the distinct user that is associated with the calling number comprises:
  providing, by the speech-enabled device and to a server, a query that includes the user account and the calling number; and
  receiving, by the speech-enabled device and from the server,
responsive content that is responsive to the query;

in response to determining that the responsive content includes the contact name for the distinct user that is associated with the calling number:
  providing, for audible output at the shared speech-enabled device, at least (i) an indication of the given user that is associated with the called number, and (ii) an indication of the contact name for the distinct user that is associated with the calling number;

in response to determining that the responsive content does not include the contact name for the distinct user that is associated with the calling number:
  providing, for audible output at the shared speech-enabled device, at least (i) an indication of the given user that is associated with the called number, and (ii) an indication of the calling number without any reference to any contact name; and in response to providing the audible output at the shared speech-enabled device:
  receiving, at the shared speech-enabled device, audio data that captures a voice command for how to handle the incoming voice call;
  determining, at the shared speech-enabled device, and based on processing the audio data that captures the voice command, whether to execute the voice command;
  in response to determining to execute the voice command and in response to determining that the voice command indicates a desire to answer the incoming call:
    answering, by the shared speech-enabled device, the incoming call on behalf of the given user; and
  in response to determining to execute the voice command and in response to determining that the voice command indicates a desire to not answer the incoming call:
    refraining from answering, by the shared speech-enabled device, the incoming call on behalf of the given user.

12. The system of claim 11, wherein identifying the user account that is associated with the given user comprises:
  determining that the called number matches a number that corresponds with the user account; and
  in response to determining that the called number matches that number associated with the user account, identifying the user account that is associated with the given user.

13. The system of claim 12, wherein determining that the called number matches the number that corresponds with the user account comprises:
  obtaining multiple numbers that each separately correspond with a respective one of multiple user accounts accessible by the shared speech-enabled device; and
  determining that one of the multiple numbers that are obtained matches the called number.

14. The system of claim 11, wherein receiving, by the speech-enabled device and from the server, the responsive content that is responsive to the query comprises:
  receiving audio data that represents synthesized speech corresponding to (ii) the indication of the contact name for the distinct user that is associated with the calling number.

15. The system of claim 11, wherein determining whether the contact entries associated with the user account include the contact name for the distinct user that is associated with the calling number further comprises:
  receiving the contact entries associated with the user account as the responsive content that is responsive to the query;
  determining that the calling number matches a number that corresponds to a particular contact entry, of the contact entries, associated with the user account; and
  in response to determining that the calling number matches the number that corresponds to the particular contact entry, of the contact entries, associated with the user account, determining that the responsive content includes the contact name for the distinct user that is associated with the calling number.

16. The system of claim 11, wherein the indication of the incoming voice call indicates the calling number and the called number.

17. The system of claim 11, wherein providing at least (i) the indication of the given user that is associated with the called number, and (ii) the indication of the contact name for the distinct user that is associated with the calling number, for audible output at the shared speech-enabled device comprises:
  outputting synthesized speech that includes at least (i) the indication of the given user that is associated with the called number, and (ii) the indication of the contact name for the distinct user that is associated with the calling number via a speaker of the shared speech-enabled device.

18. The system of claim 11, wherein the incoming voice call comprises a Voice over Internet Protocol (VoIP) call.

19. A non-transitory computer-readable medium storing software comprising instructions executable by one or more computers which, upon such execution, cause the one or more computers to perform operations comprising:
  receiving, at a shared speech-enabled device that is associated with a plurality of users, an indication of an incoming voice call;

determining, at the shared speech-enabled device, and based on the incoming voice call, a calling number and a called number, the called number being associated with a given user from among the plurality of users that are associated with the shared speech-enabled device, and the calling number being associated with a distinct user that is distinct from each of the plurality of users that are associated with the shared speech-enabled device;

identifying, at the shared speech-enabled device, a user account that is associated with the given user;

determining whether contact entries associated with the user account include a contact name for the distinct user that is associated with the calling number, wherein determining whether the contact entries associated with the user account include the contact name for the distinct user that is associated with the calling number comprises:

providing, by the speech-enabled device and to a server, a query that includes the user account and the calling number; and receiving, by the speech-enabled device and from the server, responsive content that is responsive to the query;

in response to determining that the responsive content includes the contact name for the distinct user that is associated with the calling number:

providing, for audible output at the shared speech-enabled device, at least (i) an indication of the given user that is associated with the called number, and (ii) an indication of the contact name for the distinct user that is associated with the calling number; and in response to determining that the responsive content does not include the contact name for the distinct user that is associated with the calling number:

providing, for audible output at the shared speech-enabled device, at least (i) an indication of the given user that is associated with the called number, and (ii) an indication of the calling number without any reference to any contact name; and in response to providing the audible output at the shared speech-enabled device:

receiving, at the shared speech-enabled device, audio data that captures a voice command for how to handle the incoming voice call;

determining, at the shared speech-enabled device, and based on processing the audio data that captures the voice command, whether to execute the voice command;

in response to determining to execute the voice command and in response to determining that the voice command indicates a desire to answer the incoming call:

answering, by the shared speech-enabled device, the incoming call on behalf of the given user; and in response to determining to execute the voice command and in response to determining that the voice command indicates a desire to not answer the incoming call:

refraining from answering, by the shared speech-enabled device, the incoming call on behalf of the given user.

\* \* \* \* \*